United States Patent
Sarmiento et al.

(10) Patent No.: US 12,485,580 B2
(45) Date of Patent: Dec. 2, 2025

(54) ELECTRIC CUTTING MACHINE

(71) Applicant: GERMANS BOADA, S.A., Rubi (ES)

(72) Inventors: Miguel Angel Sarmiento, Rubi (ES); Alek Ipatenko, Rubi (ES)

(73) Assignee: GERMANS BOADA, S.A., Rubi (ES)

( * ) Notice: Subject to any disclaimer, the term of this patent is extended or adjusted under 35 U.S.C. 154(b) by 356 days.

(21) Appl. No.: 17/789,731

(22) PCT Filed: Oct. 30, 2020

(86) PCT No.: PCT/ES2020/070669
§ 371 (c)(1),
(2) Date: Jun. 28, 2022

(87) PCT Pub. No.: WO2022/090588
PCT Pub. Date: May 5, 2022

(65) Prior Publication Data
US 2023/0033763 A1 Feb. 2, 2023

(51) Int. Cl.
*B28D 1/04* (2006.01)
*B23D 1/00* (2006.01)
(Continued)

(52) U.S. Cl.
CPC ............ *B28D 1/047* (2013.01); *B23D 1/006* (2013.01); *B23D 47/025* (2013.01); *F16C 29/04* (2013.01);
(Continued)

(58) Field of Classification Search
CPC .......... B28D 1/047; B28D 1/04; B28D 5/023; B28D 5/024; B23D 47/025; B23D 47/02;
(Continued)

(56) References Cited

U.S. PATENT DOCUMENTS 2,450,601 A * 10/1948 Lasar ..................... B23D 53/06
83/435.11
3,265,450 A * 8/1966 Aho ....................... F16C 29/045
384/57
(Continued)

FOREIGN PATENT DOCUMENTS

| CA | 2512116 | 1/2007 |
|---|---|---|
| ES | 434526 | 1/1977 |

OTHER PUBLICATIONS

WIPO, International Search Report for PCT/ES2020/070669, Dec. 11, 2020.

*Primary Examiner* — Monica S Carter
*Assistant Examiner* — Kent N Shum
(74) *Attorney, Agent, or Firm* — Hodgson Russ LLP

(57) ABSTRACT

Disclosed is an electric cutting machine comprising: a base (1); a longitudinally movable table (2); a cutting head (3) provided with a cutting disc (32) and an electric drive motor (33); two rolling assemblies (4) with wheels (41) and rolling bearings (43) mounted by means of independent axles (42, 44) on a vertical partition (52) of parallel longitudinal profiles (5) mounted on the base (1); a pair of longitudinal guides (6) attached to the movable table (2) and which comprise a longitudinal support track (63) for supporting on the wheels (41) of the corresponding rolling assembly (4), and a horizontal wing (65) located under the rolling bearings (43) of the corresponding rolling assembly (4); and interchangeable longitudinal guides (6a) longer than the longitudinal guides (6), for adapting the cutting capacity.

3 Claims, 4 Drawing Sheets

(51) Int. Cl.
*B23D 47/02* (2006.01)
*F16C 29/04* (2006.01)
*B23D 1/02* (2006.01)
*B23D 1/04* (2006.01)

(52) U.S. Cl.
CPC .................. *B23D 1/02* (2013.01); *B23D 1/04* (2013.01); *F16C 2322/34* (2013.01)

(58) Field of Classification Search
CPC .... B23D 45/02; B23D 45/021; B23D 45/027; B23D 45/028; B23D 45/022; B23D 45/046; B23D 45/061; B23D 45/063; B23D 45/066; F16C 29/04; F16C 2322/34; B24B 7/075; B26D 1/18; B26D 1/185; B26D 1/01; B26D 1/60; B26D 1/605; B27B 17/005; B27B 5/065; B27B 5/18; B27B 5/207; B27B 5/181; B27B 5/187
See application file for complete search history.

(56) References Cited

U.S. PATENT DOCUMENTS

| | | | |
|---|---|---|---|
| 3,970,127 A * | 7/1976 | Thiele | B27B 5/222 |
| | | | 144/242.1 |
| 5,676,124 A | 10/1997 | Lee | |
| 6,000,387 A | 12/1999 | Lee | |
| 6,347,624 B1 * | 2/2002 | Smith | B23D 47/025 |
| | | | 125/35 |
| 6,675,690 B1 | 1/2004 | Tyus | |
| 7,455,003 B2 | 11/2008 | Sheddy et al. | |
| 2007/0034292 A1 * | 2/2007 | Smith | B23D 47/025 |
| | | | 144/287 |
| 2008/0087153 A1 | 4/2008 | Lee | |
| 2009/0277315 A1 | 11/2009 | Ipatenco et al. | |
| 2017/0120477 A1 * | 5/2017 | Chang | B28D 7/04 |
| 2017/0326755 A1 * | 11/2017 | Sheddy | B23D 45/02 |
| 2020/0070264 A1 * | 3/2020 | Hart | B28D 1/047 |
| 2020/0254905 A1 * | 8/2020 | Dry | B60N 2/01566 |
| 2022/0168924 A1 * | 6/2022 | Chaikowsky | B28D 1/047 |

* cited by examiner

ELECTRIC CUTTING MACHINE

CROSS-REFERENCE TO RELATED APPLICATION

This application is a U.S. national stage entry of International Application No. PCT/ES2020/070669, filed Oct. 30, 2020.

FIELD

The present invention relates to an electric cutting machine of the type of those used in the construction industry for cutting various pieces, such as: tiles, floor tiles, ceramic plates or other similar pieces.

BACKGROUND

Electric cutting machines used for cutting tiles and similar construction pieces are well known today on the market, said machines having a base on which the following are mounted: a movable table provided with an upper surface for supporting the piece to be cut, and an adjustable cutting head provided with a cutting disc driven by an electric motor.

Those cutting machines that most resemble the cutting machine object of the present invention have a cutting head fixed to the base by means of a fixed arm, such that said head is located above the movable table.

Said cutting head is also known to be rotatable with respect to an axis parallel to the movement direction of the table, so as to be located perpendicular to same and to make a vertical cut along the piece, or with different inclinations so as to make a bevelled cut, for example at 45 or 60 degrees, along the piece. Said cutting head also rotates with respect to an axis perpendicular to the movement direction of the table in order to change the cutting depth.

In cutting machines of this type, the head does not move in the cutting direction, as it is the table that is in charge of moving the piece to be cut with respect to the base and the cutting head.

For the longitudinal movement of the table, these cutting machines comprise parallel guides fixed to the base of the machine and rolling means fixed to the table and moving along the guides of the base, allowing the longitudinal movement of the table under the cutting head.

With the mentioned arrangement, i.e., with the guides fixed to the base and the rolling means fixed to the table, cutting machines with different embodiments are known.

Document U.S. Pat. No. 7,455,003 discloses an electric saw comprising: substantially parallel first and second rail assemblies arranged on the base; a first rolling assembly mounted on an axle coupled to the table and having a roller and a first bearing and a second bearing assembly having a second bearing coupled to the table; and wherein the roller rolls over a first surface of the first rail assembly for the table to slide along the first rail assembly, whereas the first bearing is supported against a second surface of the first rail assembly and prevents the table from being lifted off the base. This document contemplates the guiding and movement means of the table allowing said table to be cantilevered with respect to the end of the base in order to increase its movement range.

Document US2009/0277315A1 discloses a tile saw that includes a base with two parallel guides and a table with pairs of wheels vertically spaced apart and located, respectively, above and below the corresponding guide, allowing the longitudinal movement of the table along the guides of the base.

Other documents, i.e., U.S. Pat. Nos. 5,676,124 and 6,000,387A, likewise describe guiding means fixed to the base of the electric saw and rolling means fixed to the movable table.

These background documents present a series of drawbacks, among which the difficulty in adapting the cutting machine to different cutting capabilities and the risk of misalignment of the rollers due to impacts during transport of the machine with the table being removed, can be mentioned.

SUMMARY

The electric cutting machine of the invention comprises: a base on which there are mounted a movable table provided with an upper surface for supporting the piece to be cut, and an adjustable cutting head provided with a cutting disc driven by an electric motor; it presents technical features which allow the aforementioned drawbacks to be resolved.

According to the invention, the cutting machine comprises two rolling assemblies mounted on the base of the cutting machine by means of parallel longitudinal profiles comprising a lower surface fixed to said base and a vertical partition facing the upper area; comprising each rolling assembly: wheels and rolling bearings arranged on opposite sides of the vertical partition of the corresponding vertical profile, spaced apart along said longitudinal profile and mounted by means of independent axles on said vertical partition.

Said cutting machine comprises a pair of longitudinal guides fixed in the lower portion to the movable table, and comprising an upper surface which is prolonged towards the lower area in a first arm and in a second arm ending respectively in a longitudinal support track on the wheels of the corresponding rolling assembly of the base, and in a horizontal wing facing the first arm and located under the rolling bearings of the corresponding rolling assembly.

The mounting of the rolling assemblies on the base and the mounting of the longitudinal guides on the movable table provide a series of advantages, in terms of both the manufacture and the use, namely:

- Given that the wheels and the rolling bearings are on the base, and not on the table, guides as long as desired can be mounted on the movable tables to obtain a higher cutting capacity without adding rolling elements (wheels or rolling bearings) and without modifying the base of the cutting machine.
- It facilitates the installation of the table in the saw insofar as it is more quickly aligned and advances more quickly.
- It is easier to align the saw, and such alignment is maintained for more time.
- The machine can be packaged without the table, and the rolling assemblies, which are mounted on the base, maintain their factory alignment when the client assembles the machine and mounts the movable table on the rolling assemblies.
- When the table is removed for cleaning, the rolling assemblies remain mounted on the base and aligned, eliminating the risks of impact and misalignment to which they are exposed when mounted on the table.

According to the invention, the machine comprises removable means for fixing the longitudinal guides to the movable table and at least two interchangeable pairs of longitudinal guides of a different length.

Advantageously, at least one of the interchangeable pairs of longitudinal guides has a longer length than the movable table, which allows the movement range of the table in the longitudinal direction, and accordingly the cutting capacity, to be increased without needing to change the movable table or increase the number of rolling assemblies existing on the base, which would entail greater alignment difficulty.

This feature allows the same cutting machine to have a significantly different cutting capacity, maintaining most of the pieces. This also allows the sale of table assemblies and accessories for updating the client's cutting machine. This provides greater flexibility for generating cutting machines with different features and accessories such that they can be personalised.

BRIEF DESCRIPTION OF THE DRAWINGS

As a complement to the description provided herein, and for the purpose of helping to make the features of the invention more readily understandable, the present specification is accompanied by a set of drawings which, by way of illustration and not limitation, represent the following.

DETAILED DESCRIPTION

Figure 1:
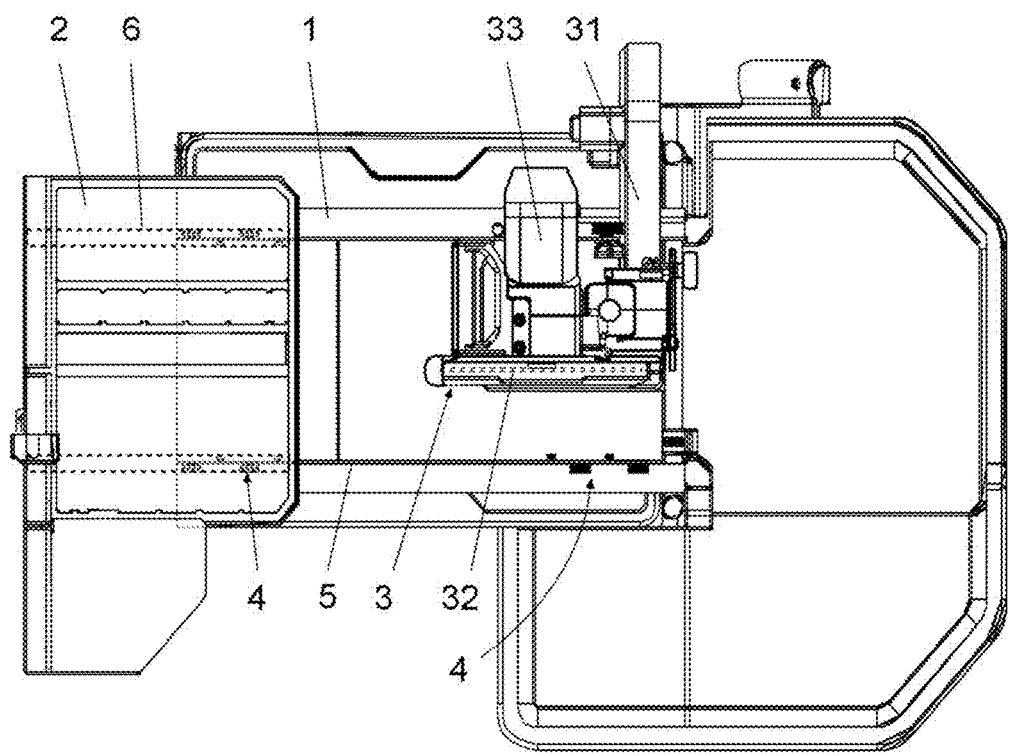
FIG. 1 shows a schematic plan view of an exemplary embodiment of the cutting machine according to the invention.

The cutting machine depicted in FIG. 1 comprises a base (1) on which is mounted: a movable table (2) in longitudinal direction for the support of the pieces to be cut, and a cutting head (3) fixed to the base (1) by means of an arm (31).

Said cutting head (3) has a cutting disc (32) driven by means of an electric motor (33) and can rotate with respect to a longitudinal axis and with respect to a transverse axis in order to change the lateral inclination of the cutting disc (32) and the cutting depth, respectively.

Figure 2:
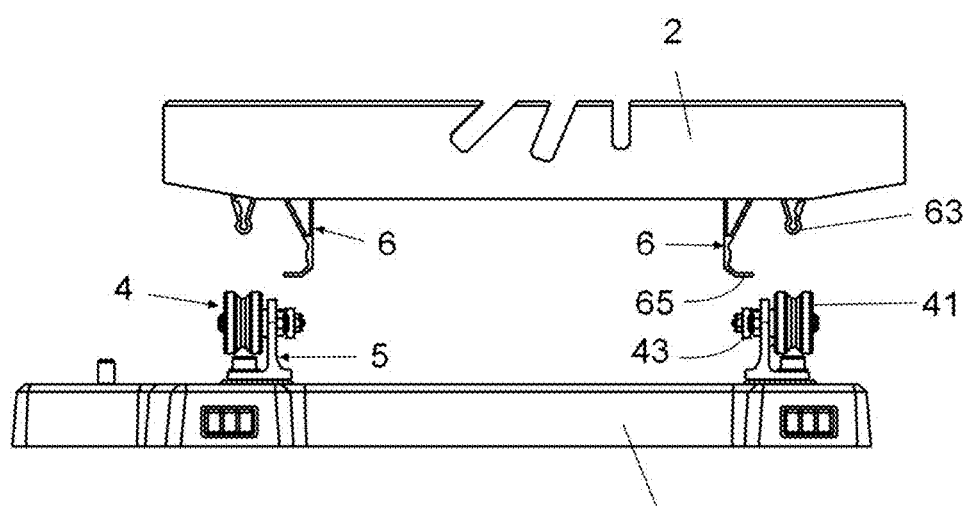
FIG. 2 shows a profile view of the base of the cutting machine with the rolling assemblies and of the movable table, which bears the longitudinal guides, removed and moved vertically with respect to the base.

As shown in FIG. 2, on the base (1) there are mounted longitudinal support profiles (5) for supporting the rolling assemblies (4) suitable for the support and longitudinal movement of longitudinal guides (6) fixed to the lower surface of the movable table (2).

Figure 3:
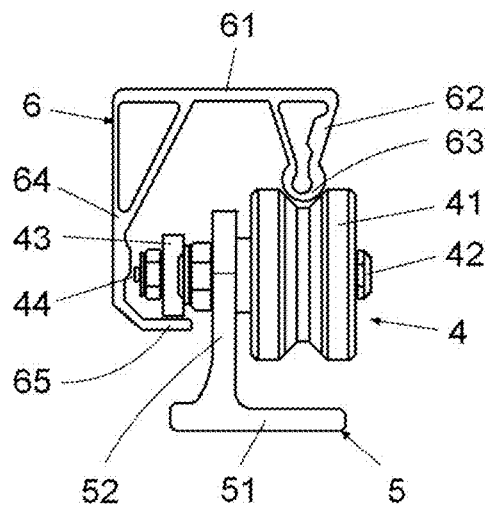
FIG. 3 shows a profile view of a longitudinal guide of the movable table mounted on one of the rolling assemblies.

As observed in FIG. 3, the longitudinal profiles (5) in charge of supporting the rolling assemblies (4) comprise a lower surface (51) intended for being fixed to the base (1) of the cutting machine, as shown in FIG. 2, and a vertical partition (52) facing the upper area.

The rolling assemblies (4) comprise wheels (41) arranged on the outer side of the corresponding longitudinal profile (5), and rolling bearings (43) arranged on the inner side of the longitudinal profile (5).

The wheels (41) and the rolling bearings (43) are spaced apart along said longitudinal profile (5) and mounted by means of independent axles (42, 44) on said vertical partition (52).

FIG. 3 also depicts the corresponding longitudinal guide 6 comprising an upper surface (61) intended for being fixed with removable means, in this case screws (not depicted), to the lower surface of the movable table (2).

The upper surface (61) of the longitudinal guides (6) is prolonged towards the lower area in a first arm (62) ending in a longitudinal track (63) and in a second arm (64) ending in the lower portion in a horizontal wing (65) facing the first arm (62).

Figure 4:
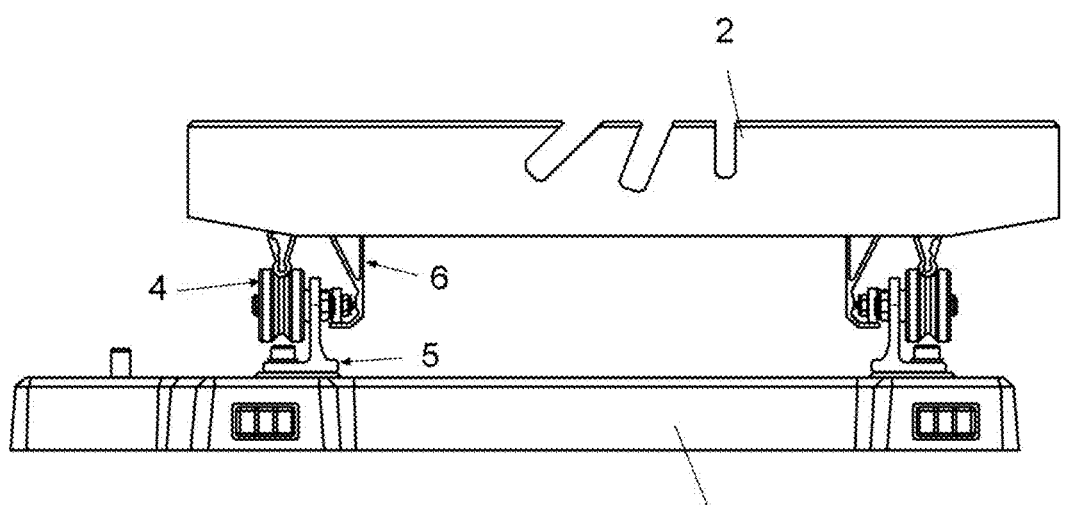
FIG. 4 shows a profile view of the movable table of the cutting machine mounted by means of the corresponding longitudinal guides on the rolling assemblies of the base of the cutting machine.

As shown in FIG. 4, in the mounting position of the movable table (2), the longitudinal track (63) of the longitudinal guides (6) fixed to said movable table is supported on the wheels (41) of the rolling assemblies (4) mounted on the base (1), and the horizontal wing (65) of the longitudinal guides (6) is located under the rolling bearings (43) of said rolling assemblies.

Figure 5:
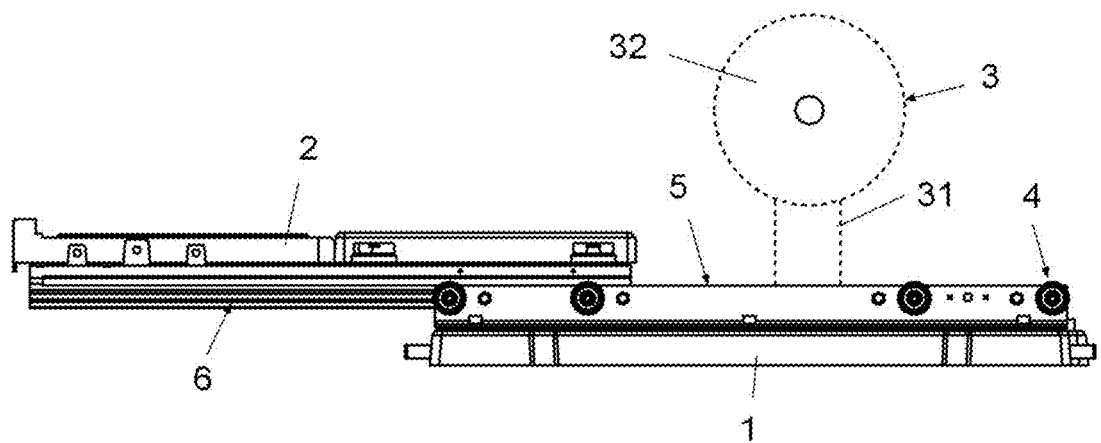
FIGS. 5 and 6 show respective elevation views of the movable table mounted in two end positions on the rolling assemblies of the base of the cutting machine.
Figure 6:
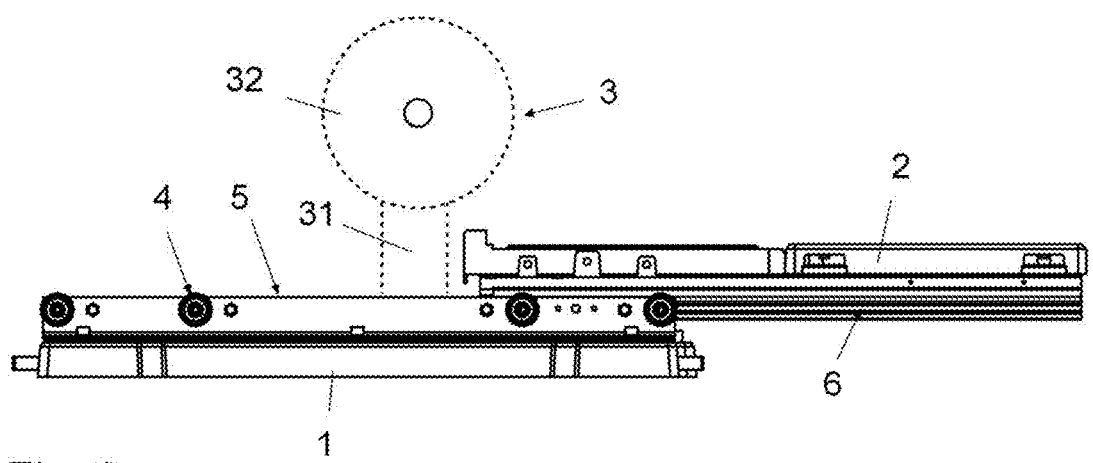

FIGS. 5 and 6 schematically depict the cutting disc (32) to provide a positional reference of the carriage at the two end positions of movement with respect to the base (1). In said figures, the movable table (2) has a pair of longitudinal guides (6) having a length similar to that of said table.

Figure 7:
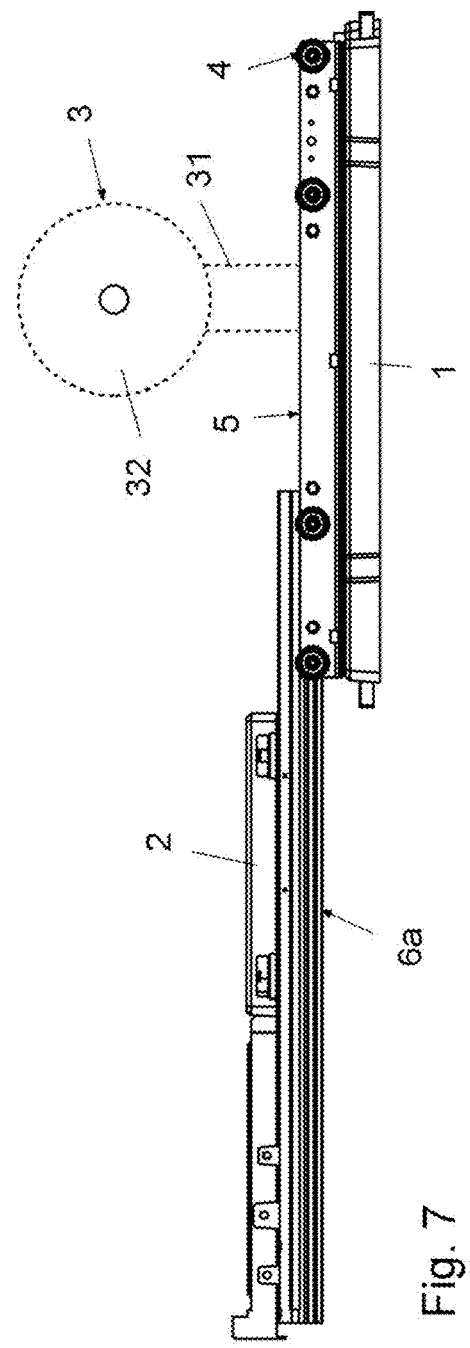
FIGS. 7 and 8 show respective views similar to FIGS. 5 and 6, respectively, and in which the guides of the movable table have been replaced with other longer guides.
Figure 8:
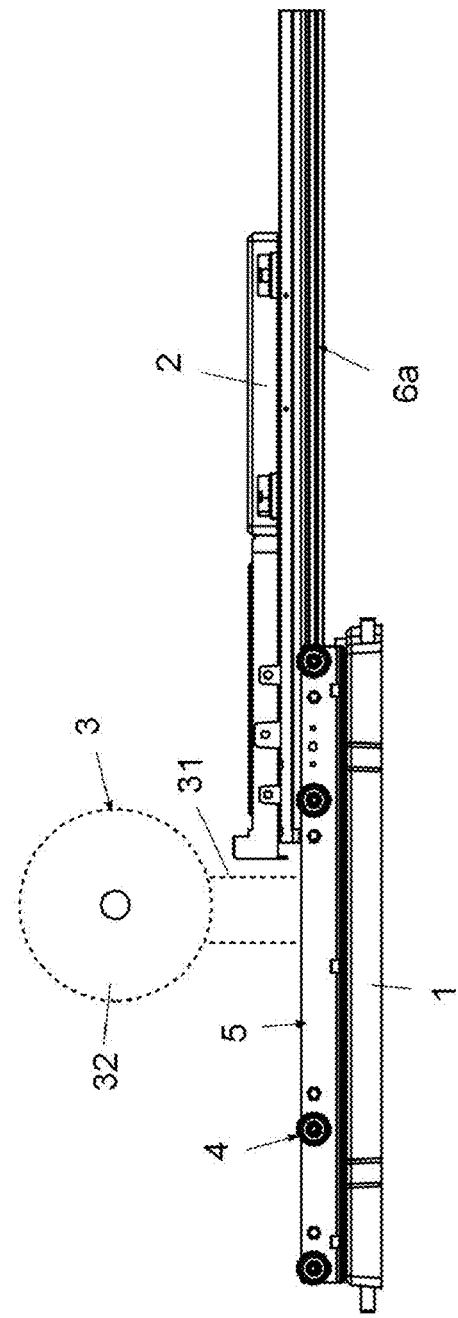

FIGS. 7 and 8 depict the movable table (2) of FIGS. 5 and 6, provided in this case with a pair of guides (6a), longer than the longitudinal guides (6), which allow the movement range of said movable table (2), and accordingly the cutting capacity of the machine, to be increased without modifying the base (1) or the rolling assemblies (4) mounted on said base (1).

Having sufficiently described the nature of the invention, in addition to a preferred exemplary embodiment, it is hereby stated for the relevant purposes that the materials, shape, size and layout of the described elements may be modified, provided that it does not imply altering the essential features of the invention claimed below.

The invention claimed is:

1. An electric cutting machine, comprising:
   a base;
   a movable table mounted on the base configured to move in a longitudinal cutting direction and forming a support surface for a tile or piece to be cut;
   an adjustable cutting head mounted on the base and comprising a cutting disc located above the movable table and an electric drive motor driving the cutting disc;
   a pair of longitudinal profiles, parallel and spaced apart, mounted on the base of the cutting machine, each longitudinal profile comprising a lower surface configured for attachment to said base and a vertical partition facing an upper area;
   rolling assemblies supported on said longitudinal profiles and spaced apart along the longitudinal profiles, each rolling assembly comprising: a wheel and a rolling bearing arranged on opposite sides of the vertical partition of a corresponding longitudinal profile, and mounted by means of independent axles on said vertical partition; and
   a pair of side longitudinal guides fixed to the movable table, each of said side longitudinal guides comprising an upper surface configured for attachment to a lower portion of the movable table, said upper surface extending from the lower portion in a first arm and in a second arm of different length, parallel and spaced apart, the first arm ending in a longitudinal support track that is configured to be supported on the wheels of a corresponding rolling assembly and the second arm ending in a horizontal wing facing the first arm and is configured to be located under the rolling bearing of a corresponding rolling assembly and the second arm further including an inclined reinforcing branch connected to the upper surface.

2. The machine according to claim 1, further comprising at least two interchangeable pairs of side longitudinal guides of a different length and configured to be removably attachable for alternative fixing thereof to the movable table.

3. The machine according to claim 2, wherein at least one of the interchangeable pairs of side longitudinal guides has a longer length than the movable table.

\* \* \* \* \*